July 21, 1959 R. J. KOCOUREK 2,895,157
WIPER MECHANISM
Filed July 13, 1955 3 Sheets-Sheet 1
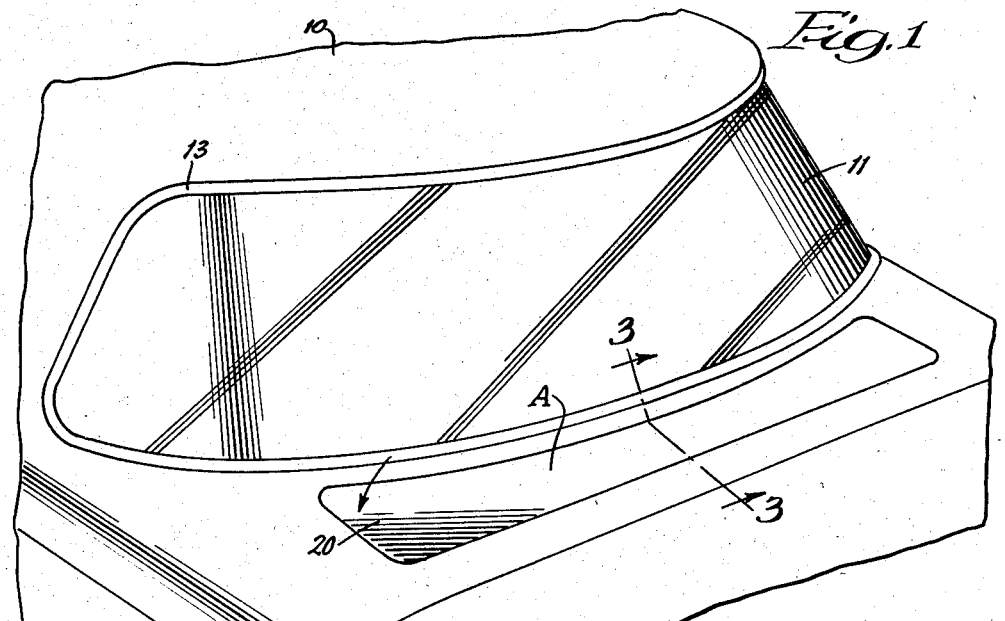
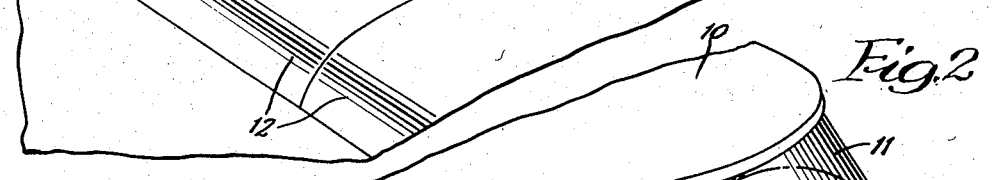
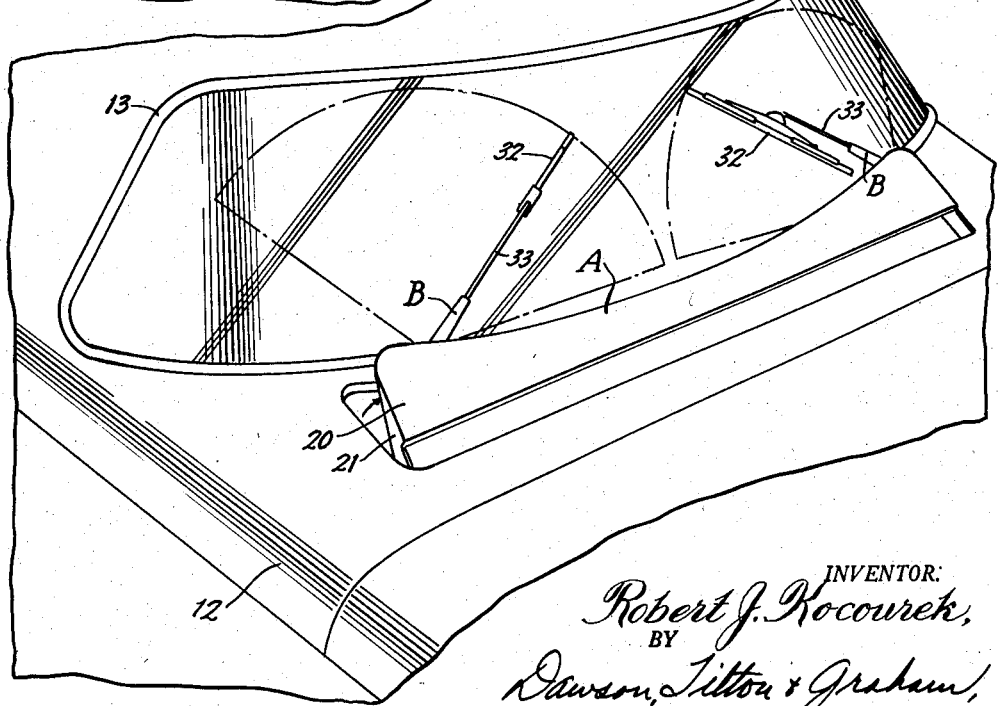
INVENTOR:
Robert J. Kocourek,
BY
Dawson, Tilton & Graham,
ATTORNEYS.

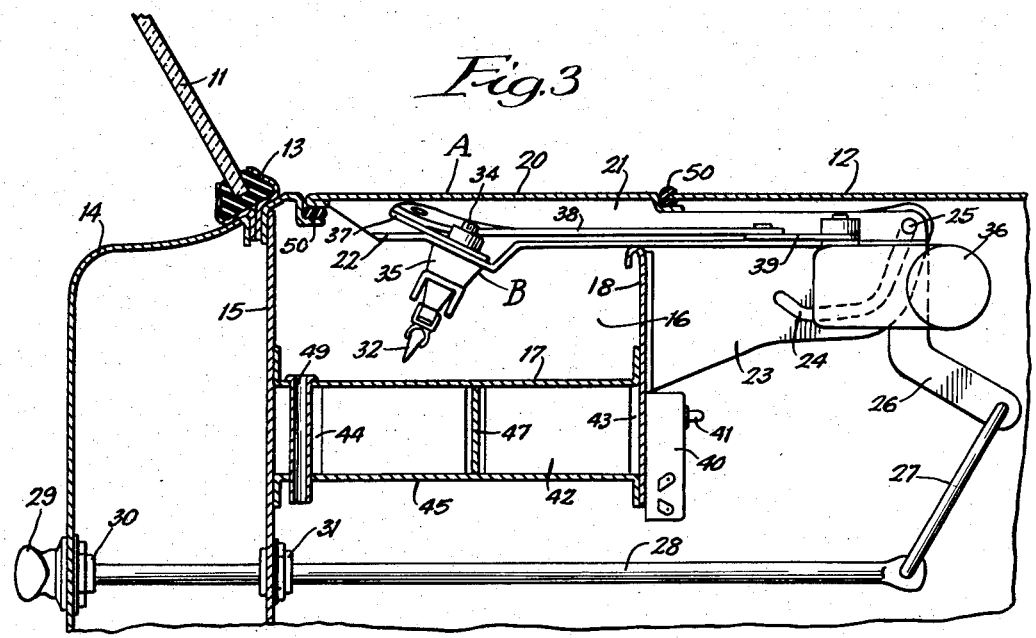
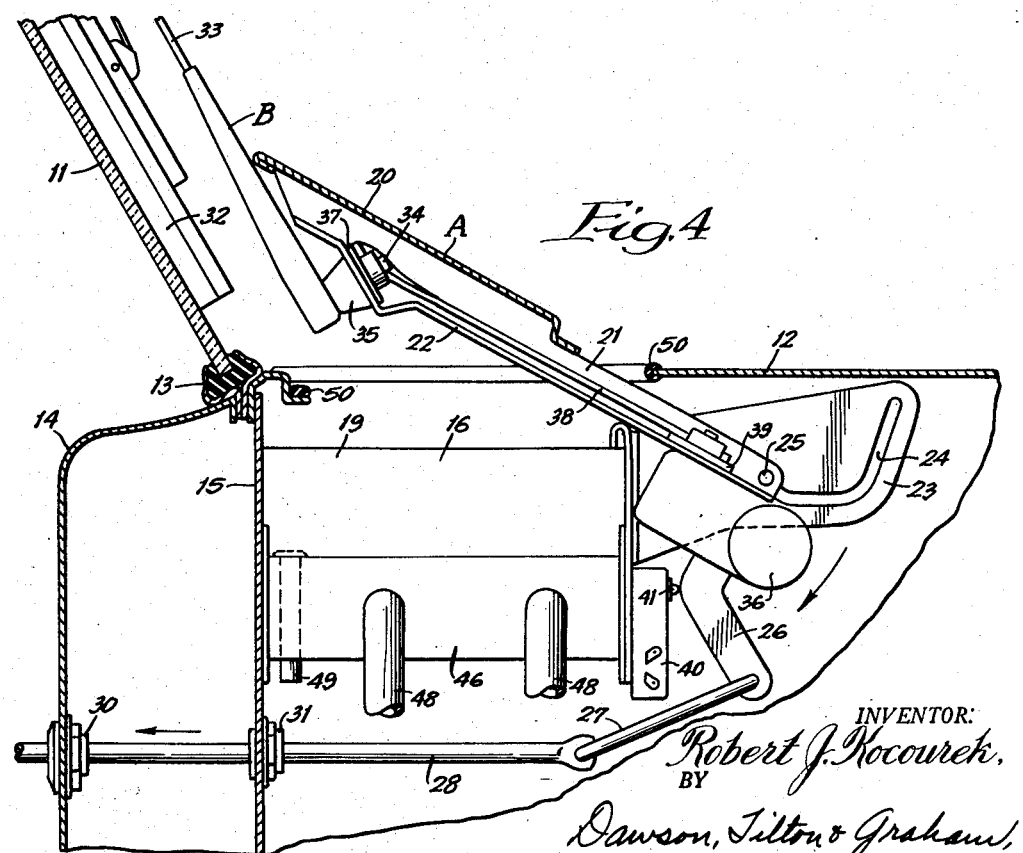

July 21, 1959
R. J. KOCOUREK
2,895,157
WIPER MECHANISM
Filed July 13, 1955
3 Sheets-Sheet 3
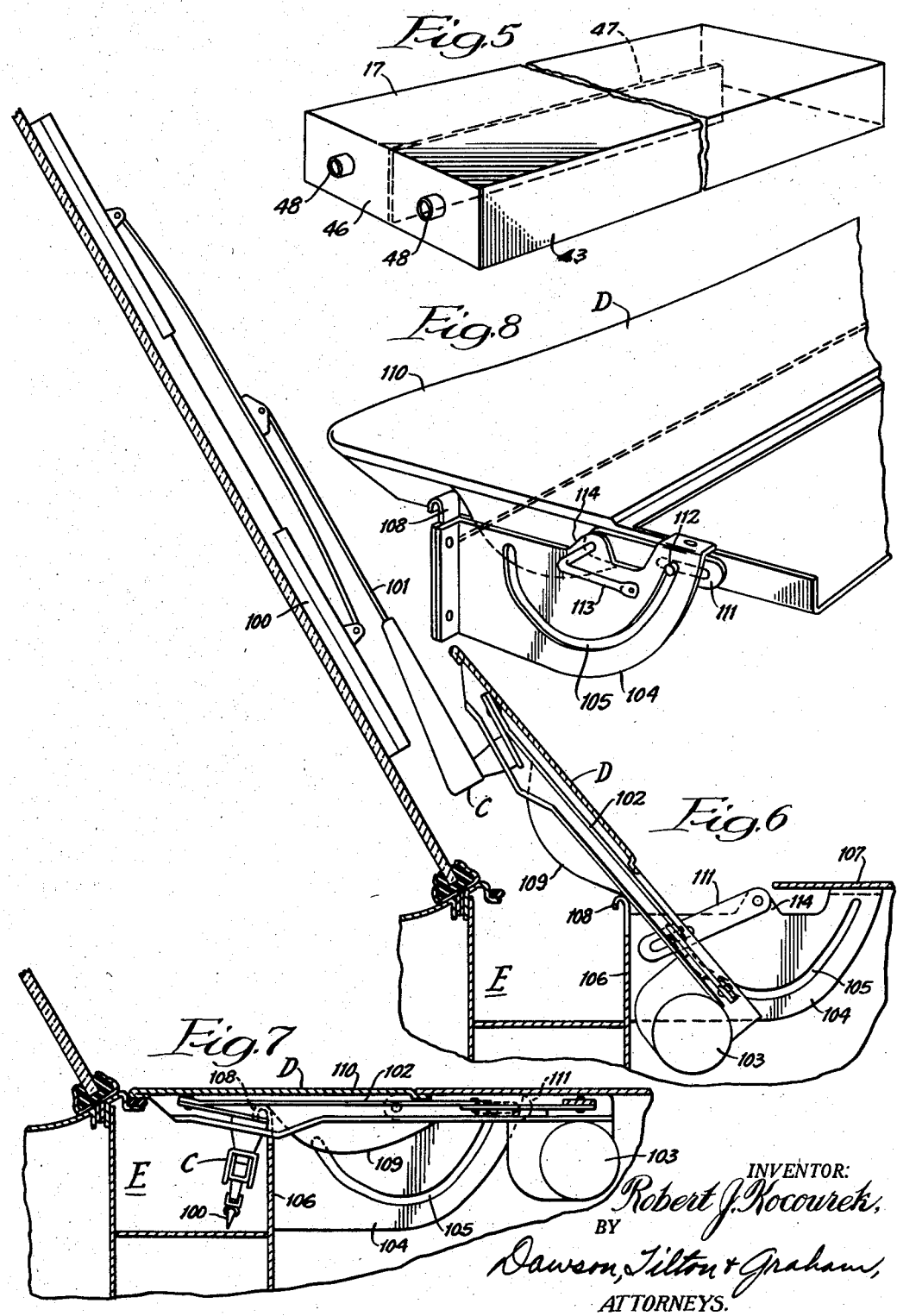
INVENTOR:
Robert J. Kocourek,
BY
Dawson, Tilton & Graham,
ATTORNEYS.

United States Patent Office 2,895,157
Patented July 21, 1959

2,895,157

WIPER MECHANISM

Robert J. Kocourek, Chicago, Ill.

Application July 13, 1955, Serial No. 521,771

6 Claims. (Cl. 15—253)

This invention relates to wiper mechanisms, and more specifically to retractible wiper mechanisms which are normally retracted but which may be extended for the clearing of water, ice, snow and dirt from the windshields of motor vehicles and other carriers.

It is believed well known that a windshield wiper representative of the type commonly found on vehicles, aircraft and even boats consists generally of a rubber or rubber-like wiper blade which is mounted upon an arm, and which is normally held in a non-operating position adjacent the edge of a windshield. The opposite end of the arm is connected to a motor which may be operated to move the blade over the windshield when it is desired that the window be cleared or cleaned.

A major disadvantage of present wiper mechanisms resides in the fact that wiper blades remain exposed to the elements even during periods of non-use. Consequently, the blades often collect dirt and because of their exposure to the sun, wind, etc., deteriorate to such an extent that they render unsatisfactory service when they are needed for cleaning a window. Unless the blades are changed frequently, their performance may be so unsatisfactory that the safety of the occupants of the vehicle or carriers may be in danger.

The continuous exposure of the blades produces other problems. For instance, during winter months the blades often freeze on the window or windshield of the vehicle. Snow sometimes covers the blades in their resting position and must be removed before the mechanism can be operated. Furthermore, small ice particles frequently adhere to the blade and greatly reduce the effectiveness of the mechanism in clearing a window.

Aside from the adverse effects that unprotected or exposed wiper blades may have upon visibility and safety generally, the presence of wiper arms and blades resting against the vehicle window during periods of non-use detracts from the streamlined appearance of a motor vehicle. Furthermore, exposed blades and wiper arms are frequently responsible for undesirable "wind noise" during the operation of a vehicle, and on high-speed carriers such as aircraft they may actually produce enough air resistance to measurably reduce the speed of that carrier.

Therefore, one of the main objects of the present invention is to overcome the aforementioned defects of present-day wiper mechanisms. Another object is to provide a compact and effective wiper mechanism which may be moved to a concealed or retracted position during periods of non-use, and may be extended to operating position when needed for the cleaning of windows. A further object is to provide an effective wiper mechanism which utilizes the wiper blade, arm and motor assembly commonly used on present-day carriers, and which is adapted to move the wiper blade into a concealed position in order to protect the blade during periods of non-use from exposure to sun, wind, and other deteriorating agencies. A still further object is to provide a retractible wiper mechanism with a heated chamber so that the wiper assembly may be freed of ice and snow during periods of non-use, and may be ready for effective operation whenever it is needed. Other objects and advantages will appear from the specification and drawings, in which:

Figure 1 is a broken perspective view of an automobile showing the wiper mechanism of the present invention in concealed or retracted position; Figure 2 is similar to Figure 1, but illustrates the wipers in operating position; Figure 3 is a broken sectional side view of the wiper mechanism taken along line 3—3 of Figure 1; Figure 4 is like Figure 3 but shows the wiper mechanism in extended or operating position; Figure 5 is a broken perspective view of the heating unit used in the present invention; Figures 6 and 7 are broken sectional side views of another embodiment of the present invention, and show the wiper mechanism in extended and retracted positions, respectively; and Figure 8 is a broken perspective view showing details of construction of the second embodiment of my invention.

Referring to the drawings, Figures 1 and 2 show an automobile 10 having a windshield 11 and a hood or body portion 12 extending outwardly therefrom. A resilient sealing member 13 extends about the windshield to secure the glass on the automobile body and to render the interior of the automobile weather-tight. Since the foregoing structures are well known, further description herein is believed unnecessary except in reference to the retractible mechanism of my invention.

While the present invention is shown in conjunction with an automobile, it is to be understood at the outset that my wiper mechanism is intended for a variety of motor carriers, such as trucks, buses, aircraft, boats, etc. Furthermore, the term "windshield," as here used, is not to be limited in meaning to the front windowpane of a carrier, but is intended to include all windows with which present-day wiper assemblies might be suitably used.

As shown in detail in Figures 3 and 4, the automobile body is equipped with the customary dashboard or panel 14 and a firewall 15. The upper portion of the firewall forms the rear wall of a compartment 16 which is defined also by bottom wall 17, front wall or baffle 18 and side walls 19. These walls may be secured to each other by any suitable means, as for instance by welding.

The retractible wiper mechanism comprises mainly a movable support member A and a wiper assembly B. The support member largely consists of an elongated cover portion 20 which extends substantially across the hood 12 adjacent windshield 11, and at least one pair of legs 21 which extend across the underside of the cover and project forwardly therefrom. As illustrated in Figure 2, the legs 21 are preferably positioned at opposite ends of cover 20, and may either be formed integrally with the cover portion (as shown) or they may be fabricated from separate pieces and secured to the cover by welding or by any other suitable means. Most desirably, each of the legs is equipped with an inwardly turned flange along its lower edge which adapts the support member for attachment to the wiper assembly B, and for sliding movement upon baffle 18 as will presently appear.

The top edge of the baffle 18 is illustrated as being turned rearwardly to provide a curved or rounded surface for supporting the member A. Extending from the front of the baffle and secured thereto by welding or other means, is at least one pair of slotted guide members 23, each of which lies along the generally vertical plane adjacent one of the forwardly projecting legs 21. Each guide member is provided with a J-shaped slot 24, the vertical or upright portion of the J having a slight forward inclination.

The forward portion of each leg 21 is equipped with a laterally extending pin 25 which is adapted to ride along track or slot 24 of the guide member. As shown in Figures 3 and 4, the support member angles downwardly from the region of pin 25 and then turns forwardly to form a generally L-shaped foot portion 26. The end of this foot portion is apertured to receive one end of a link 27 which has its opposite end inserted through the eye of a pull rod 28. The rod 28 extends through apertures provided in both the firewall 15 and the dashboard 14 and is equipped at its rear end with a handle 29. The fittings 30 and 31, in the dashboard and firewall respectively, permit the sliding movement of the pull rod therethrough so that the pull rod, link and support member may be moved by the manipulation of handle 29. While I have shown a manually operated pull rod, however, it will be understood that the movement of the rod and support member may be accomplished by other means well known in the art, such as for instance electric or hydraulic devices.

The wiper assembly is principally composed of a wiper blade, a wiper arm, connecting rods and a motor which may be coupled with a switch for automatic operation thereof. The wiper blade 32 is entirely conventional and may be flexible and sectioned, as shown in Figure 2, so that it conforms to the curvature of modern windshields. The blade 32 is connected in the customary manner to one end of a wiper arm 33. The opposite end of the arm is equipped with a shaft 34 which extends through a bearing 35 mounted upon the inwardly turned flange 22 of support member A. It is to be noted that while the flange 22 generally extends in a plane parallel to the cover 20, the flange dips in the region of bearing 35 to provide a downwardly and forwardly inclined surface for attachment of the bearing. This is significant because the wiper blades may then be placed in operative position against windshield 11, while at the same time the cover 20 is elevated only slightly and does not obstruct the vision of the occupants of the vehicle.

The shaft 34 is connected to a motor 36 by means of connecting links or rods 37, 38 and 39. The motor 36 may be an electric motor, as shown, or it may be of the vacuum type, and is mounted upon the support member in any suitable manner. Like the conventional windshield wiper motors now in common use, motor 36 is adapted to drive the shaft 34, wiper arm 33 and blade 32 in a continuously reversing arcuate path.

Since it is desirable to reduce and simplify the manual operation of the wiper mechanism as much as possible, a switch 40 is mounted upon the lower portion of baffle plate 18 so that when the wiper mechanism is in the position shown in Figure 4 the heel of the L-shaped portion 26 engages the switch button 41 and the wiper motor is automatically turned on.

Below the compartment 16 is a second compartment or cell 42 defined by walls 17, 43, 44, 45 and 46, and is divided by partition 47. These walls define a chamber which is placed in communication with the exhaust manifold of a motor carrier by means of conduits 48. As shown best in Figure 5, the partition 47 joins one side wall 46 of the cell but terminates short of the opposite side wall to provide a U-shaped passage within the cell. During the operation of a motor carrier, hot exhaust gases circulate through the cell and heat not only the cell but also the compartment directly above that cell. To carry off rain water and melted ice and snow from compartment 16, the compartment may be provided with a drain tube 49.

Normally, the wiper mechanism assumes the retracted position shown in Figure 3. Under such conditions, the support member lies in a generally horizontal position and the cover 20 is closed. The wiper blade and arm are maintained within compartment 16 by the horizontally disposed support member and cannot be seen from the outside of the vehicle, as is evident from Figure 1. Not only is the wiper assembly concealed from view, but it is kept clean and dry within the compartment. When the vehicle motor is in operation, exhaust gases flow through the exhaust cell 42 and heat the chamber 16 so that any snow or ice which has accumulated upon the wiper assembly and support member contained within and adjacent to chamber 16 is quickly melted and is carried away through drain tube 49. Resilient sealing members 50 may be provided on the body portion of the vehicle or carrier adjacent cover 20 so that rain, dirt, snow, etc. cannot fall into the compartment 16 when cover 20 is closed and the wiper mechanism is in retracted position.

When the mechanism is in retracted position, the intermediate portion of the support member rests upon baffle 18, and the pin 25 toward the front end of leg 21 is moved upwardly as far as it will go within the J-shaped track 24. It is to be particularly noted that the forwardly moved pull rod 28 and link 27 tend to lock the wiper mechanism in retracted position until operation of the mechanism is necessary or desirable.

When the windshield wiper or wipers are needed for clearing the windshields of a motor carrier, the handle 29 is pulled rearwardly. The L-shaped foot 26 is pulled downwardly and rearwardly, and the support member A pivots upwardly about pin 25. At the same time, pin 25 slides within track 24 so that the front portion of the support member is first guided downwardly, then rearwardly and finally a short distance upwardly. During this operation, the flange 22 of leg 21 slides along the curved top portion of baffle 18. The result is that when the pull rod is drawn inwardly or rearwardly, the cover 20 and wiper assembly B are first pivoted upwardly and are then carried rearwardly until the blade 32 is brought into contact with window 11. When the support member is fully extended, and the wiper blade 32 is in operative position, the heel of foot 26 engages switch button 41, and the wiper motor 36 is put into motion. The wiper blade is thereby carried in an arcuate path across windshield 11, and cleans the windshield in the customary manner.

Figures 6, 7 and 8 show a second embodiment of my invention. The wiper assembly C, including the blade 100, wiper arm 101, links 102 and motor 103, are identical to those already described. The principal difference resides in the structure of the support member D and the guide member 104.

As most clearly shown in the perspective view of Figure 8, the guide member 104 comprises a vertical plate having a generally U-shaped track or groove 105. This plate may be bolted or otherwise secured to the forward wall 106 of the compartment E and may also be attached by bolts, rivets or welding to a fixed horizontal body portion 107 of the motor carrier. Each side of the forward wall of the compartment is also provided with an upwardly extending and rearwardly curved member 108, upon which an outer curved flange 109 of cover 110 is adapted to ride.

Between guide member 104 and the side wall or outer flange 109 of the cover is a link 111 which is slotted at one of its ends. Flange 109 carries a laterally projecting pin 112 which extends through the slot of link 111 and through the slot or track of guide member 104. The opposite end of the link 111 is welded or otherwise rigidly secured to one end of an actuator member or crank 113, which in turn extends through and is pivotally mounted upon an upstanding portion 114 of the fixed guide member 104.

The crank end of the actuator lever 113 may be connected to any suitable mechanical or manual actuating means (not shown), such as the manual pull rod and handle shown and described in reference to the first embodiment of my invention. I wish it to be understood, however, that this embodiment may be retracted and extended by any suitable electrical or hydraulic operated presently used in modern vehicles.

Figures 7 and 8 show the support member in a normally retracted position. When it is desired that the support member be moved to an extended or operative position, the actuator lever 113 is turned clockwise and the slotted link 111 is carried thereby in a clockwise direction. Consequently, pin 112 is forced downwardly along the U-shaped track 105 and the forward portion of the support member D is pivoted about pin 112 and is carried downwardly, rearwardly, and finally upwardly along track 105. At the same time, the curved flange 109 of the support member D rides or slides over fixed member 108 so that the rear portion of the support member is first lifted upwardly, then moved in the direction of the windshield until finally the wiper blade settles against the window in the operative position shown in Figure 6. When the wiper mechanism is no longer needed for the clearing or cleaning of the windshield, the above operation is reversed and the wiper blade is again placed in the compartment 115.

While I have set forth two embodiments of my invention in considerable detail for purposes of illustration, it will be understood by those skilled in the art that many of these details may be varied considerably without departing from the spirit and scope of this invention.

I claim:

1. In combination with a vehicle having a windshield and a body portion extending outwardly therefrom, said body portion being provided with a compartment adjacent said windshield, a support member selectively movable between a substantially horizontal retracted position and an upwardly inclined extended position, said support member providing a cover for said compartment when in said retracted position, a wiper assembly mounted beneath said support member and comprising a wiper arm, a wiper blade mounted thereon, and a wiper motor for moving said blade in an arcuate path across said windshield when said support member is in said extended position, said wiper assembly being carried within said compartment when said member is in a retracted position, means for moving said member between said extended and said retracted position, and means provided by said body portion and operably connected with said support member for guiding movement of said member between retracted and extended positions so that said wiper blade contacts said windshield only when said support member is fully extended.

2. The structure of claim 1 in which said body portion provides an exhaust cell below said compartment for heating said compartment.

3. A retractable wiper mechanism for a motor carrier equipped with a windshield and a body portion adjacent said windshield, said body portion providing a compartment for housing said wiper mechanism, a support member movably mounted upon said body portion for movement between an extended position and a retracted position adjacent said compartment, a wiper assembly mounted upon said support member and comprising a wiper arm, a wiper blade mounted thereon, and a motor for moving said blade in an arcuate path across said windshield when said support member is in an extended position, said wiper assembly being carried within said compartment when said member is in retracted position, means for selectively moving said support member between said extended and retracted positions, and guide means for guiding movement of said member between said extended and retracted positions, said guide means including a vertical member mounted upon said body portion for slidably supporting said support member as it is moved between extended and retracted positions, and a guide member provided by said frame for varying the angle of said support member with reference to said windshield as said support member is moved upon said vertical member, said support member cooperatively engaging said vertical and guide members for positioning said wiper blade against said windshield only when said support member is in fully extended position.

4. The structure of claim 3 in which said guide member comprises a vertical plate having an arcuate slot therein, said support member being provided with a pin projecting laterally through said slot for sliding movement therein.

5. A retractable wiper mechanism for a motor carrier equipped with a windshield and a body portion adjacent thereto, said body portion providing a compartment for housing said wiper mechanism, a support member movably mounted upon said body portion for movement between an extended position and a retracted position adjacent said compartment, a wiper assembly being mounted upon said support member and including a wiper arm equipped with a blade, said wiper assembly being carried within said compartment when said member is in retracted position, means for selectively moving said support member between said extended and retracted positions, and guide means for guiding movement of said support member to prevent contact between said blade and said windshield while said member is being moved into and out of its fully extended position, said guide means including a fixed support provided by said body portion for slidably supporting said member as it is moved between extended and retracted positions, and a guide fixed to said frame for varying the angle of said member with reference to said windshield as said member is moved over said fixed support, said member cooperatively engaging said support and guide for positioning said wiper blade against said windshield only when said member is in fully extended position.

6. The structure of claim 5 in which said guide comprises a vertical plate having a slot therein, said support member being provided with a pin projecting laterally through said slot for sliding movement therealong.

References Cited in the file of this patent

UNITED STATES PATENTS

| | | |
|---|---|---|
| 2,166,146 | Hayward | July 18, 1939 |
| 2,206,822 | Rousseau | July 2, 1940 |
| 2,271,225 | Heffernan | Jan. 27, 1942 |
| 2,505,078 | Allen | Apr. 25, 1950 |
| 2,514,772 | Kramer | July 18, 1950 |
| 2,759,214 | Madunich | Aug. 21, 1956 |

FOREIGN PATENTS

| | | |
|---|---|---|
| 721,465 | Great Britain | Jan. 5, 1955 |
| 1,065,779 | France | Jan. 13, 1954 |